US012714541B2

(12) United States Patent
Makarenkova et al.

(10) Patent No.: US 12,714,541 B2
(45) **Date of Patent: *Aug. 25, 2026**

(54) DENTAL APPLIANCE HOOK PLACEMENT AND VISUALIZATION

(71) Applicant: Align Technology, Inc., San Jose, CA (US)

(72) Inventors: Svetlana Makarenkova, Moscow (RU); Mikhail Yudashkin, Moscow (RU); Andrey Cherkas, Krasnoznamensk (RU); Kristina Anikina, Moscow (RU); Viktor Sazhaev, Moscow (RU)

(73) Assignee: Align Technology, Inc., San Jose, CA (US)

( * ) Notice: Subject to any disclaimer, the term of this patent is extended or adjusted under 35 U.S.C. 154(b) by 227 days.

This patent is subject to a terminal disclaimer.

(21) Appl. No.: 18/327,020

(22) Filed: May 31, 2023

(65) Prior Publication Data

US 2023/0320819 A1 Oct. 12, 2023

Related U.S. Application Data

(63) Continuation of application No. 16/457,401, filed on Jun. 28, 2019, now Pat. No. 11,701,203.

(60) Provisional application No. 62/692,119, filed on Jun. 29, 2018.

(51) Int. Cl.

| | |
|---|---|
| ***A61C 7/00*** | (2006.01) |
| ***A61C 7/08*** | (2006.01) |
| ***A61C 9/00*** | (2006.01) |
| *A61C 7/02* | (2006.01) |

(52) U.S. Cl.

CPC ................ *A61C 7/002* (2013.01); *A61C 7/08* (2013.01); *A61C 9/0046* (2013.01); *A61C 7/02* (2013.01)

(58) Field of Classification Search

None

See application file for complete search history.

(56) References Cited

U.S. PATENT DOCUMENTS

| | | | | |
|---|---|---|---|---|
| 2002/0192617 A1* | 12/2002 | Phan | A61C 19/003 | 433/18 |
| 2003/0152884 A1* | 8/2003 | Wiechmann | A61C 7/145 | 433/9 |
| 2003/0198912 A1* | 10/2003 | Mah | A61C 7/08 | 433/5 |
| 2004/0229183 A1* | 11/2004 | Knopp | A61C 7/00 | 433/213 |
| 2005/0048433 A1* | 3/2005 | Hilliard | A61C 7/00 | 433/24 |
| 2006/0188834 A1* | 8/2006 | Hilliard | A61C 7/08 | 433/24 |
| 2008/0141534 A1* | 6/2008 | Hilliard | A61C 7/02 | 29/896.11 |

(Continued)

*Primary Examiner* — Heidi M Eide

(74) *Attorney, Agent, or Firm* — Shay Glenn LLP

(57) ABSTRACT

Provided herein are systems and methods for determining hook and or positioning feature placements during dental treatment planning. A patient's dentition may be scanned and/or segmented. A target tooth may be identified. Hook and or positioning feature placement may be determined based on satisfying manufacturing and clinical constraints. The hook or positioning features can be input into a dental treatment planning system.

19 Claims, 12 Drawing Sheets

(56) References Cited

U.S. PATENT DOCUMENTS

2011/0269092 A1* 11/2011 Kuo ....................... B33Y 50/02
433/215
2012/0295211 A1* 11/2012 Frantz ..................... A61C 7/08
264/16
2013/0078594 A1* 3/2013 Leslie-Martin .......... A61C 7/08
427/2.29
2014/0120490 A1* 5/2014 Borovinskih ............ A61C 7/08
433/24
2014/0363779 A1* 12/2014 Kopelman ............... A61C 7/08
29/896.11
2016/0157961 A1* 6/2016 Lee ........................ A61C 7/002
382/131
2017/0007363 A1* 1/2017 Boronkay ............ A61C 1/0046
2018/0042701 A1* 2/2018 Kim ......................... A61C 7/08

* cited by examiner

200
GENERATE 3D MODEL OF THE PATIENT'S ARCH
202
IDENTIFY REGION ON TARGET TOOTH SURFACE THAT SATISFIES MANUFACTURING AND CLINICAL CONSTRAINTS FOR HOOK PLACEMENT
204
ASSIGN AT LEAST ONE HOOK PLACEMENT IN REGION FOR TREATMENT PLAN
206

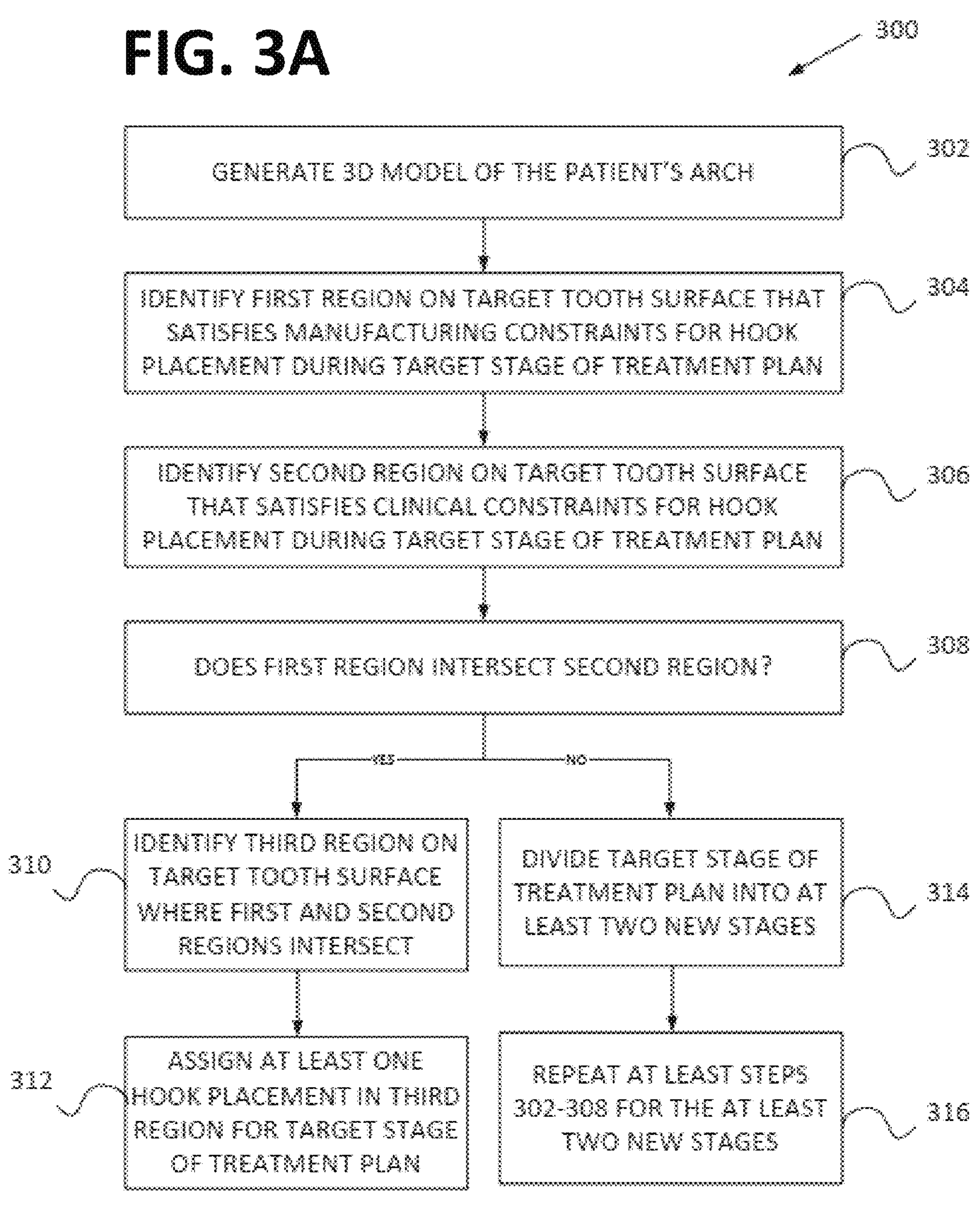
FIG. 3A
300
GENERATE 3D MODEL OF THE PATIENT'S ARCH
302
IDENTIFY FIRST REGION ON TARGET TOOTH SURFACE THAT SATISFIES MANUFACTURING CONSTRAINTS FOR HOOK PLACEMENT DURING TARGET STAGE OF TREATMENT PLAN
304
IDENTIFY SECOND REGION ON TARGET TOOTH SURFACE THAT SATISFIES CLINICAL CONSTRAINTS FOR HOOK PLACEMENT DURING TARGET STAGE OF TREATMENT PLAN
306
DOES FIRST REGION INTERSECT SECOND REGION?
308
YES
NO
IDENTIFY THIRD REGION ON TARGET TOOTH SURFACE WHERE FIRST AND SECOND REGIONS INTERSECT
310
DIVIDE TARGET STAGE OF TREATMENT PLAN INTO AT LEAST TWO NEW STAGES
314
ASSIGN AT LEAST ONE HOOK PLACEMENT IN THIRD REGION FOR TARGET STAGE OF TREATMENT PLAN
312
REPEAT AT LEAST STEPS 302-308 FOR THE AT LEAST TWO NEW STAGES
316

FIG. 3B

| SATISFIES MANUFACTURING AND CLINICAL CONSTRAINTS? | YES | NO | YES | YES |
|---|---|---|---|---|
| SEGMENT NUMBER | 1 | 2 | 3 | 4 |

TREATMENT PLAN DURATION

FIG. 3C

| SATISFIES MANUFACTURING AND CLINICAL CONSTRAINTS? | YES | YES | YES | YES | YES |
|---|---|---|---|---|---|
| SEGMENT NUMBER | 1 | 2 | 3 | 4 | 5 |

TREATMENT PLAN DURATION

DENTAL APPLIANCE HOOK PLACEMENT AND VISUALIZATION

CROSS REFERENCE TO RELATED APPLICATIONS

This patent application is a continuation of U.S. patent application Ser. No. 16/457,401, filed on Jun. 28, 2019, titled "DENTAL APPLIANCE HOOK PLACEMENT AND VISUALIZATION," now U.S. Patent Application Publication No. 2020/0000553, which claims priority to U.S. Provisional Patent Application No. 62/692,119, filed on Jun. 29, 2018, titled "DENTAL ALIGNER HOOK PLACEMENT AND VISUALIZATION," each of which is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

BACKGROUND

Dental treatments (e.g., orthodontic, restorative, etc.) using a series of patient-removable appliances (e.g., "aligners") can be useful for treating various conditions such as malocclusions. Treatment planning is typically performed in conjunction with the dental professional (e.g., dentist, orthodontist, dental technician, etc.), by generating a model of the patient's teeth in a final configuration and then breaking the treatment plan into a number of intermediate stages (steps) corresponding to individual appliances that are worn sequentially. This process may be interactive, adjusting the staging and in some cases the final target position, based on constraints on the movement of the teeth and the dental professional's preferences. Once the final treatment plan is finalized, the series of appliances may be manufactured to implement the treatment plan.

This treatment planning process may include many manual steps that are complex and may require a high level of knowledge of orthodontic norms. Further, because the steps are performed in series, the process may require a substantial amount of time. Manual steps may include preparation of the model for digital planning, reviewing and modifying proposed treatment plans (including staging) and aligner features placement (which includes features placed either on a tooth or on an aligner itself). These steps may be performed before providing an initial treatment plan to a dental professional, who may then modify the plan further and send it back for additional processing to adjust the treatment plan, repeating (iterating) this process until a final treatment plan is completed and then provided to the patient. During the treatment planning process, the dental professional may review the current state of the patient's teeth, each iterative stage of treatment, and the final treatment stage.

In some instances, it may be advantageous to use an orthodontic elastic member at least for part of a treatment plan to generate a tension force between a patient's upper and lower teeth to bring the teeth into a desired occlusion. Orthodontic elastic members may help provide corrective forces and/or help move a patient's teeth and/or jaw into proper alignment. Hooks, precision cuts, and/or other structures used to receive and react force from elastics (collectively referred to herein as "hook structures") have been integrated into dental appliances (e.g., removable orthodontic aligners) to, for example, bring a patient's teeth toward a desired occlusion.

However, it is often difficult to properly place structures that receive elastics into many removable dental appliances. One example issue is that clinical constraints, such as the use of attachments and/or other bonded structures may interfere with hooks, precision cuts, etc. placed too closely thereto. Placing structures that receive elastics into removable dental appliances can also be limited by manufacturing constraints, such as difficulty in removing the removable dental appliances from molds based on the angle of the hook and proximity of a structure that receives elastics to a cutline. Additionally, some patients' teeth may require large rotation movements over the course of a treatment, which can result in structures that receive elastics "rotating" into the gingiva in treatment planning/visualization software and resulting in models of removable dental appliances calling for features to be formed outside an appliance body (e.g., impractical to manufacture).

SUMMARY OF THE DISCLOSURE

Implementations address the need to improve the placement of dental hooks and positioning features in shell aligners during treatment planning to increase the efficiency and effectiveness of the treatment and manufacturing of the aligners. The present application addresses these and other technical problems by providing technical solutions and/or automated agents that automatically place hooks and other positioning features during treatment planning that satisfy manufacturing and clinical constraints. These techniques may provide the basis for implementation of automated orthodontic treatment plans, design and/or manufacture of orthodontic aligners (including series of polymeric orthodontic aligners that provide forces to correct malocclusions in patients' teeth).

In general, example apparatuses (e.g., devices, systems, etc.) and/or methods described herein may receive a representation of a patient's teeth, and automatically place hooks or other positioning features on the patient's teeth at the appropriate stages in the treatment plan based on manufacturing and clinical constraints. The apparatuses and/or methods described herein may provide instructions to generate and/or may generate a set or series of aligners, and/or orthodontic treatment plans using orthodontic aligners that incorporate the hook or positioning feature placement during treatment planning. The apparatuses and/or methods described herein may provide a visual representation of the patient's teeth including current and/or potential hook placements.

A "patient," as used herein, may be any subject (e.g., human, non-human, adult, child, etc.) and may be alternatively and equivalently referred to herein as a "patient" or a "subject." A "patient," as used herein, may but need not be a medical patient. A "patient," as used herein, may include a person who receives orthodontic treatment, including orthodontic treatment with a series of orthodontic aligners.

Any of the apparatuses and/or methods described herein may be part of a distal tooth scanning apparatus or method, or may be configured to work with a digital scanning apparatus or method.

As will be described in greater detail herein, automatically placing hooks or other positioning features may include collecting a 3D scan of the patient's teeth. Collecting the 3D scan may include taking the 3D scan, including scanning the patient's dental arch directly (e.g., using an intraoral scanner) or indirectly (e.g., scanning an impression of the patient's teeth), receiving the 3D scan information from a separate device and/or third party, receiving the 3D scan from a memory, or the like.

The 3D scan information may be standardized and/or normalized. Standardizing the scan may include converting the 3D scan into a standard format (e.g., a tooth surface mesh), and/or expressing the 3D scan as a number of angles (e.g., vector angles) from a center point of each tooth, etc. In some variations, standardizing may include normalizing the 3D scan using another tooth, including stored tooth values.

The standardized 3D scan information may then be processed to extract one or more features that may be used to determine potential placement locations for hooks or positioning features; specifically, tooth surface regions that satisfy manufacturing and clinical constraints for hook placement. This information may be used to automatically and accurately place the hooks or positioning features on the 3D model, e.g., by displaying a graphic showing the potential position(s) of hooks or positioning features over images of the 3D model.

Standardizing may include identifying a predetermined number of angles relative to a center point of the target tooth. Any appropriate method may be used to determine the center of the tooth. For example, the center of the tooth may be determined from a mesh point representation of each tooth (e.g., from a segmented version of the 3D scan representing a digital model of the patient's teeth) by determining the geometric center of the mesh points for each tooth, by determining the center of gravity of the segmented tooth, etc. The same method for determining the center of each tooth may be consistently applied between the teeth and any teeth used to form (e.g., train) the systems described herein.

Standardizing may be distinct from normalizing. As used herein, standardizing may involve regularizing numerical and/or other description(s) of a tooth. For example, standardizing may involve regularizing the order and/or number of angles (from the center of the tooth) used to describe the teeth. The sizes of the teeth from the original 3D scan may be maintained.

The 3D scan of the patient's teeth may be collected in any appropriate manner that permits it to be later manipulated by the method or apparatus for standardization, feature extraction, and treatment planning. For example, gathering may include taking the 3D model of the patient's teeth directly or indirectly form the patient's teeth. For example, gathering may include receiving a 3D model of the patient's teeth from an intraoral scanner. Gathering may include receiving the 3D model from a scan of a mold of the patient's teeth.

A system (e.g., a system for automatically placing hooks or positioning features during treatment planning) may include: one or more processors; memory coupled to the one or more processors, the memory configured to store computer-program instructions, that, when executed by the one or more processors, implement a computer-implemented method, the computer-implemented method comprising: gather a three-dimensional (3D) model of a patient's teeth including a target tooth; identify a region on a target tooth for hook placement that satisfies manufacturing and clinical constraints; and assign at least one hook placement in the region on the target tooth for the target stage of a treatment plan. Any of these systems may include a memory for storing the results (e.g., the 3D model of the teeth and the treatment plan with hook placements). Any of these systems may also include an output (e.g., monitor, printer, transmitter, including wireless transmitter), etc.

In any of the apparatuses and/or methods described herein automatically determining hook placements may be performed using an apparatus (e.g., computing device) without human control or direction, particularly in the steps of receiving, determining tooth shape features, normalizing, etc. Alternatively or additionally, any of these steps may be performed partially automatically (e.g., semi-autonomously) or manually.

A computing device may receive a three-dimensional (3D) model of the patient's teeth including the target tooth either directly (e.g., as part of a scanning apparatus or system), or indirectly, including transfer from a previously taken model. The computing device may be a dedicated device or part of a dedicated device (e.g., scanner) or it may be wired or wirelessly connected to a scanning device or a memory storing scanning information. Alternatively or additionally, the computing device may receive the 3D model from a remote (e.g., internet, cloud, etc.) source.

In any of the apparatuses and/or methods described herein a target tooth may be user-selected. Alternatively or additionally, all of the teeth in a 3D model of the teeth may be selected as targets; the apparatus and methods may sequentially or concurrently determine width of the patient's arch.

In one aspect, a method of automatically determining hook and or positioning feature placements during dental treatment planning is provided, the method comprising receiving, in a computing device, a three-dimensional (3D) model of the patient's teeth including the target tooth, identifying a portion of the 3D model of the patient's dentition corresponding to a target tooth, the portion of the 3D model of the patient's dentition being associated with a region of the target tooth surface upon which placement of a dental appliance having a positioning feature will satisfy predetermined manufacturing and clinical constraints for the dental appliance, developing a dental treatment plan with at least one positioning feature placed on the dental appliance in a position that corresponds with the region of the target tooth, and outputting the dental treatment plan.

In one aspect, developing the dental treatment plan comprises overlaying a graphic with the positioning feature on the 3D model of the patient's dentition.

In another aspect, gathering the 3D model comprises one or more of taking the 3D model of the patient's teeth, receiving the 3D model of the patient's teeth from an intraoral scanner and receiving the 3D model from a scan of a mold of the patient's teeth In some examples, the dental plan comprises a plurality of incremental stages. The identifying and developing steps can be performed for each of the plurality of incremental stages.

In some aspects, the method comprises outputting a modified version of the 3D model of the patient's teeth to include the positioning feature placement.

In one example, identifying the portion of the 3D model is part of an operation of segmenting the 3D model of the patient's dentition.

In some examples, the identifying step further comprises identifying a first region of the target tooth surface upon which placement of the dental appliance having the positioning feature will satisfy predetermined manufacturing constraints for the dental appliance, and identifying a second region of the target tooth surface upon which placement of the dental appliance having the positioning feature will satisfy predetermined clinical constraints for the dental appliance.

In one aspect, the method can include identifying a third region of the target tooth surface comprising the intersection between the first region and the second region.

In another aspect, the method can include identifying that the first region does not intersect with the second region for a target stage over a target stage duration, dividing the target stage into at least two new stages over the target stage duration, and repeating the identifying steps for the at least two new stages.

In some examples, the positioning feature comprises a hook feature. The positioning feature can be configured to serve as an anchor point for elastic bands to assist in movement of the target tooth.

Also described herein are methods, including methods for determining, reviewing and/or correcting placement of one or more hooks on one or more orthodontic appliances. For example, a method may include: providing a treatment plan including a plurality of treatment stages to move a patient's teeth from an initial arrangement toward a target arrangement through a plurality of intermediate arrangements; providing a virtual model of the patient's teeth, the virtual model representing the patient's teeth in accordance with the plurality of treatment stages; identifying a hook structure configured to receive and react force from one or more elastics in accordance with one or more of the plurality of treatment stages; identifying a region of interest of the patient's teeth corresponding to the hook structure; identifying hook design constraints constraining placement of the hook structure within the region of interest of the patient's teeth; identifying in the region of interest one or more constrained hook locations for the hook structure, the one or more constrained hook locations accommodating the hook design constraints; and displaying one or more virtual representations of the hook structure at the one or more constrained hook locations on the virtual model of the patient's teeth.

A method may include: identifying a hook structure configured to receive and/or react (e.g., modify, direct, guide, redirect, etc.) force from one or more elastics in accordance with all or a subset of a plurality of treatment stages (e.g., of a treatment plan having a plurality of treatment stages to move a patient's teeth from an initial arrangement toward a target arrangement through a plurality of intermediate arrangements); identifying a region of interest of the patient's teeth corresponding to the hook structure; identifying hook design constraints constraining placement of the hook structure within the region of interest of the patient's teeth; identifying in the region of interest one or more constrained hook locations for the hook structure, the one or more constrained hook locations accommodating the hook design constraints; and displaying one or more virtual representations of the hook structure at the one or more constrained hook locations on a virtual model of the patient's teeth (e.g., a virtual model of the patient's teeth, representing the patient's teeth in accordance with one or more of the plurality of treatment stages).

In any of these methods, identifying in the region of interest one or more constrained hook locations for the hook structure may comprise identifying a plurality of constrained hook locations across a plurality of orthodontic appliances configured to be worn on the patient's teeth as part of the treatment plan. The plurality of constrained hook locations may each correspond to the same anatomical reference point on the patient's teeth (which may move as the teeth move during treatment) in accordance with the plurality of treatment stages.

As mentioned above, the hook may be part of (an in particular, may be integral with or formed as an integral part of) orthodontic appliances, including dental aligners, configured to move teeth, such as across a series of orthodontic appliances. Alternatively, in some variations some or all of the hooks may be added to (attached to, coupled to, etc.) orthodontic appliances, including dental aligners, configured to move teeth.

The hook design constraints may comprise manufacturing constraints, clinical constraints, or some combination thereof. The hook design constraints may constrain placement of the hook structure in the region of interest due to an interference with a gingival region of the patient's teeth. The hook design constraints may constrain placement of the hook structure in the region of interest due to an interference with a gingival region of the patient's teeth; and the interference may be due to a rotation of a tooth associated with the region of interest in accordance with the treatment plan. In some variations, the hook design constraints may constrain placement of the hook structure in the region of interest due to an interference with a gingival region of the patient's teeth. Identifying in the region of interest the one or more constrained hook locations may comprise moving the hook structure away from the gingival region.

The hook design constraints may constrain placement of the hook structure in the region of interest due to an interference with virtual fillers used to model a dental appliance for the patient's teeth. The virtual model of the teeth may represents the initial arrangement, the plurality of intermediate arrangements, and/or the target arrangement.

The hook structure may be configured to react the force from the one or more elastics into one or more dental appliances implementing the one or more of the plurality of treatment stages. The one or more constrained hook locations may comprise a plurality of constrained hook locations corresponding to an anatomical reference point on the patient's teeth in accordance with the plurality of treatment stages.

Displaying the one or more virtual representations of the hook structure may comprise displaying the one or more virtual representations of the hook structure on two or more treatment stages of the plurality of treatment stages represented by the virtual model.

Any of these methods may also include: receiving one or more requests to modify the one or more constrained hook locations; modifying the one or more constrained hook locations in response to the one or more requests; and displaying virtual representations of the hook structure at the modified constrained hook locations.

Any of these methods may include receiving one or more requests to modify the one or more constrained hook locations for a selected treatment stage of the one or more treatment stages; modifying the one or more constrained hook locations at other treatment stages other than the selected treatment stages in response to the one or more requests; and displaying virtual representations of the hook structure at the modified constrained hook locations. For example, a method may include receiving one or more requests to modify the one or more constrained hook locations for a target treatment stage of the one or more treatment stages, the target treatment stage corresponding to the target arrangement; and modifying, in response to the one or more requests, the one or more constrained hook locations at one or more intermediate treatment stages of the one or more treatment stages, the one or more intermediate treatment stages corresponding to one or more intermediate arrangements of the plurality of intermediate arrangements. Any of these methods may include receiving one or more requests to modify the one or more constrained hook locations; modifying the one or more constrained hook locations in response to the one or more requests; displaying virtual representations of the hook structure at the modified constrained hook locations; and wherein the modifying comprises deleting the one or more virtual representations of the hook structure or moving the one or more constrained hook locations.

Identifying in the region of interest one or more constrained hook locations for the hook structure may comprise identifying specific regions on a series of dental appliances to include the hook structures. A region of interest of the patient's teeth may correspond to a part of an exterior surface of one or more dental appliance configured to implement the treatment plan. For example, identifying the region of interest of the patient's teeth may comprise identifying an area of a specific tooth of the patient's dentition.

The virtual representation of the hook structure may comprise an animated representation of the hook structure.

Any of these methods may include scanning the patient's teeth before providing the treatment plan. Providing the treatment plan may comprise segmenting a scan of the patient's teeth. A virtual representation of the patient's teeth may comprise a three-dimensional (3D) model of the patient's teeth. Any of the methods herein may include displaying a warning in response to identifying the hook design constraints.

Also described herein are systems that may include: one or more processors; memory coupled to the one or more processors, the memory configured to store computer-program instructions, that, when executed by the one or more processors, implement a computer-implemented method, the computer-implemented method comprising: providing a treatment plan including a plurality of treatment stages to move a patient's teeth from an initial arrangement toward a target arrangement through a plurality of intermediate arrangements; providing a virtual model of the patient's teeth, the virtual model representing the patient's teeth in accordance with the plurality of treatment stages; identifying a hook structure configured to receive and react force from one or more elastics in accordance with one or more of the plurality of treatment stages; identifying a region of interest of the patient's teeth corresponding to the hook structure; identifying hook design constraints constraining placement of the hook structure within the region of interest of the patient's teeth; identifying in the region of interest one or more constrained hook locations for the hook structure, the one or more constrained hook locations accommodating the hook design constraints; and displaying one or more virtual representations of the hook structure at the one or more constrained hook locations on the virtual model of the patient's teeth.

BRIEF DESCRIPTION OF THE DRAWINGS

A better understanding of various features and advantages will be obtained by reference to the following detailed description that sets forth illustrative embodiments, in which the principles of the invention are utilized, and the accompanying drawings of which:

FIG. 3A is an example of a method of determining hook placements during treatment planning.

FIGS. 3B and 3C are schematic diagrams illustrating the division of treatment segments in the event that an intersection between manufacturing constraints and clinical constraints cannot be found for a target tooth.

DETAILED DESCRIPTION

Figure 1A:
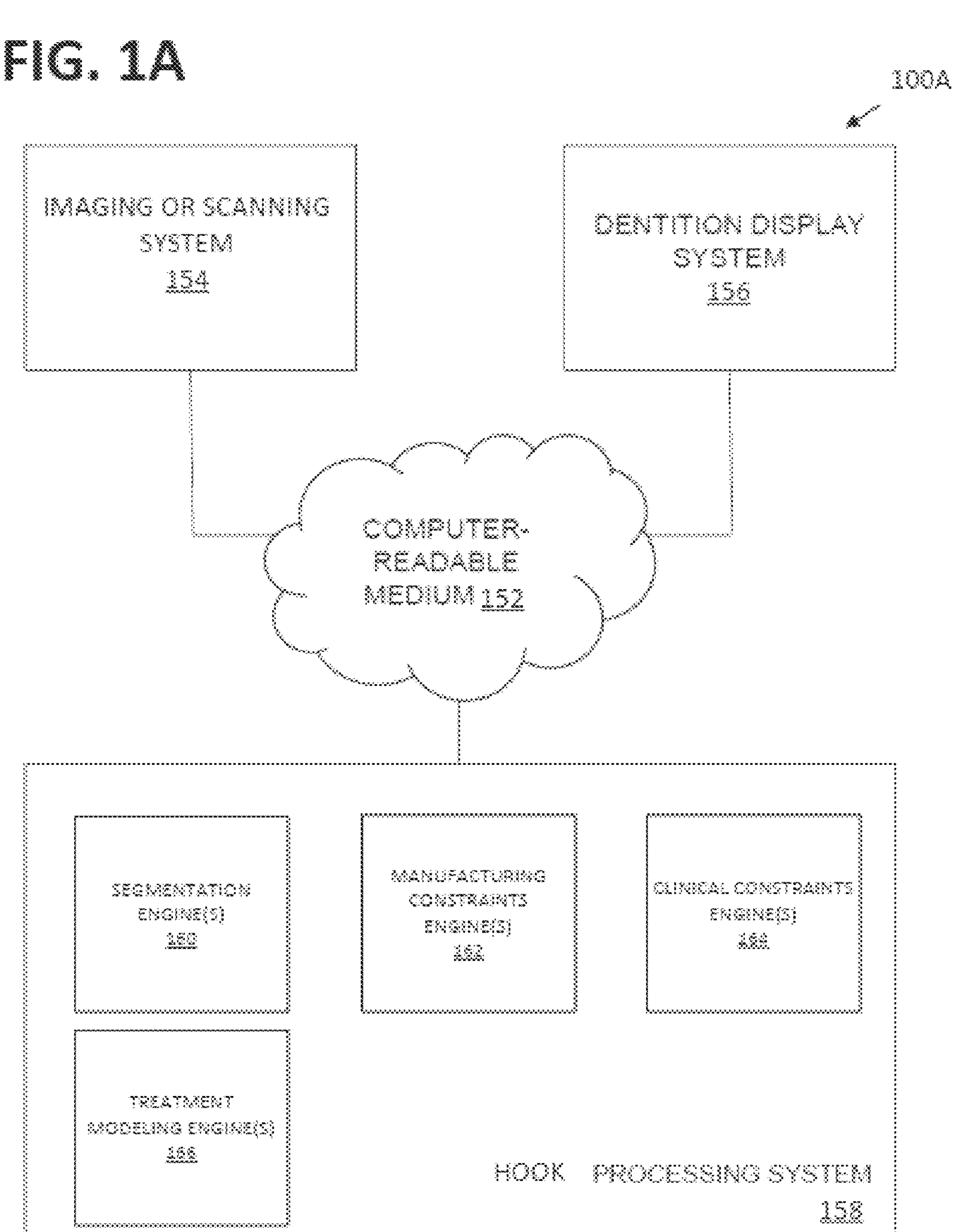
FIG. 1A is a diagram showing an example of a computing environment configured to digitally scan a dental arch and determine appropriate hook or positioning feature placements during treatment planning.

Described herein are apparatuses (e.g., systems, computing device readable media, devices, etc.) and methods for automatically determining the placement position of hooks and other positioning features during dental treatment planning. These methods and apparatus can use this information to provide output to a patient, physician, dental technician, or the like. These apparatuses and/or methods may be further configured to use the hook placement in forming one or more dental appliances (e.g., one or more, including a set, of aligners), treatment plans, or some combination of these. The apparatuses and methods described herein may allow treatment professionals, and designers and/or manufacturers of removable dental appliances to appropriately place structures that receive and/or react forces from elastics while accommodating clinical constraints and/or manufacturing constraints. The tools described herein allow treatment professionals to visualize optimal positions of structures that receive and/or react forces from elastics may reside on a dental appliance as well as where such structures may migrate through the course of a treatment plan calling implemented with a series of dental appliances. In some implementations, the tools herein allow treatment professionals to see different positions of structures that receive and/or react forces from elastics across multiple stages of a treatment plan. As noted herein, various tools may receive modifications (movements, removals, etc.) to such structures from treatment professionals at a specific stage of a treatment plan (e.g., a target stage) and may show how the modifications would appear at other stages (e.g., intermediate stages) of the treatment plan. The tools may prove advantageous to placement of structures that receive and/or react forces from elastics in cases involving complex tooth movements, such as rotations of large teeth, where such structures may change positions through the course of a treatment plan and be difficult to make. The tools may also prove useful in cases where structures that receive and/or react forces from elastics are placed close to bonded structures (e.g., attachments) and/or gingival lines of dental appliances.

The apparatuses and/or methods described herein may be useful in planning and fabrication of dental appliances, including elastic polymeric positioning appliances, is described in detail in U.S. Pat. No. 5,975,893, and in published PCT application WO 98/58596, which is herein incorporated by reference for all purposes. Systems of dental appliances employing technology described in U.S. Pat. No. 5,975,893 are commercially available from Align Technology, Inc., Santa Clara, Calif., under the tradename, Invisalign System.

Throughout the body of the Detailed Description, the use of the terms “orthodontic aligner”, “aligner”, or “dental appliance” is synonymous with the use of the terms “appliance” “removable dental appliance,” and “dental appliance”. For purposes of clarity, embodiments are hereinafter described within the context of the use and application of appliances, and more specifically “dental appliances.”

The use of the terms “hook”, “button”, “precision cut”, or “positioning feature” generally describe features on a dental appliance that aid in the treatment process. Hooks, precision cuts, positioning features, and/or buttons may serve as anchor points on the dental appliance for elastic bands (aka elastics) to assist in the movement of a target tooth. These structures are examples of structures that receive and react force from elastics into a body of a dental appliance in order to accomplish portions of a treatment plan and to move a patient’s teeth from an initial arrangement toward a target arrangement. It is noted other types of structures may receive and/or react force from elastics into a body of a dental appliance without departing from the scope and substance of the inventive concepts described herein.

“Clinical constraints,” as used herein, may refer to a set of limitations related to clinical conditions, such as conditions of a treatment plan. Examples of clinical constraints include constraints due to specific tooth movements (limited rotations, limited translations, etc.), constraints due to bonded structures (attachments that are present at a specific stage of a treatment plan, attachments that were placed at a prior stage of a treatment plan and removed, etc.), etc. A further example of a constraint due to a bonded structure is if the bonded structure falls within a threshold distance of a gingival line, thereby making it hard to place structures that receive and/or react forces from elastics between it and the gingival line. “Manufacturing constraints,” as used herein, may refer to a set of limitations limiting production of dental appliances. Examples of manufacturing constraints include placement of structures that receive and/or react forces from elastics near a gingival line of a dental appliance, and/or designs that place such structures in a way that makes forming a resulting dental appliance impractical. For instance, if a hook (or other structures that receive and/or react forces from elastics) were designed such that the course of a treatment plan rotates it “outside” a gingival line in treatment planning software, it would not be possible to form the structure into the body of the dental appliance.

The apparatuses and/or methods (e.g., systems, devices, etc.) described below can be used with and/or integrated into an orthodontic treatment plan. The apparatuses and/or methods described herein may be used to segment a patient’s teeth from a two-dimensional image and this segmentation information may be used to simulate, modify and/or choose between various orthodontic treatment plans. Segmenting the patient’s teeth can be done automatically (e.g., using a computing device). For example, segmentation can be performed by a computing system automatically by evaluating data (such as three-dimensional scan, or a dental impression) of the patient’s teeth or arch.

As described herein, an intraoral scanner may image a patient’s dental arch and generate a virtual three-dimensional model of that dental arch. During an intraoral scan procedure (also referred to as a scan session), a user (e.g., a dental practitioner) of an intraoral scanner may generate multiple different images (also referred to as scans or medical images) of a dental site, model of a dental site, or other object. The images may be discrete images (e.g., point-and-shoot images) or frames from a video (e.g., a continuous scan). The three-dimensional scan can generate a 3D mesh of points representing the patient’s arch, including the patient’s teeth and gums. Further computer processing can segment or separate the 3D mesh of points into individual teeth and gums.

An automated hook or positioning feature placement system, as used herein, may include a system that uses automated agents to identify and/or number individual teeth and/or dental features of virtual representations of teeth, such as teeth represented in a three-dimensional dental mesh model resulting from a digital scan. The automated hook or positioning feature placement system can form a treatment plan for the patient’s teeth from the dental mesh model including the placement of hooks or other positioning features integrated into the dental appliance.

The present disclosure presents one or more novel processes for identifying and segmenting a patient’s teeth during an identification process. Some implementations herein may solve technical problems related to optimizing and/or increasing the accuracy of digital dental scanning technologies.

FIG. 1A is a diagram showing an example of a computing environment 100A configured to facilitate gathering digital scans of a dental arch with teeth therein. The environment 100A includes a computer-readable medium 152, a scanning system 154, a dentition display system 156, and a hook processing system 158. One or more of the modules in the computing environment 100A may be coupled to one another or to modules not explicitly shown.

The computer-readable medium 152 and other computer readable media discussed herein are intended to represent a variety of potentially applicable technologies. For example, the computer-readable medium 152 can be used to form a network or part of a network. Where two components are co-located on a device, the computer-readable medium 152 can include a bus or other data conduit or plane. Where a first component is co-located on one device and a second component is located on a different device, the computer-readable medium 152 can include a wireless or wired back-end network or LAN. The computer-readable medium 152 can also encompass a relevant portion of a WAN or other network, if applicable.

The scanning system 154 may include a computer system configured to scan a patient’s dental arch. A “dental arch,” as used herein, may include at least a portion of a patient’s dentition formed by the patient’s maxillary and/or mandibular teeth, when viewed from an occlusal perspective. A dental arch may include one or more maxillary or mandibular teeth of a patient, such as all teeth on the maxilla or mandible or a patient. The scanning system 154 may include memory, one or more processors, and/or sensors to detect contours on a patient’s dental arch. The scanning system 154 may be implemented as a camera, an intraoral scanner, an x-ray device, an infrared device, etc. The scanning system 154 may include a system configured to provide a virtual representation of a physical mold of patient’s dental arch. The scanning system 154 may be used as part of an orthodontic treatment plan. In some implementations, the scanning system 154 is configured to capture a patient’s dental arch at a beginning stage, an intermediate stage, etc. of an orthodontic treatment plan.

The dentition display system 156 may include a computer system configured to display at least a portion of a dentition of a patient. The dentition display system 154 may include memory, one or more processors, and a display device to display the patient's dentition. The dentition display system 156 may be implemented as part of a computer system, a display of a dedicated intraoral scanner, etc. In some implementations, the dentition display system 156 facilitates display of a patient's dentition using scans that are taken at an earlier date and/or at a remote location. It is noted the dentition display system 156 may facilitate display of scans taken contemporaneously and/or locally to it as well. As noted herein, the dentition display system 156 may be configured to display the intended or actual results of an orthodontic treatment plan applied to a dental arch scanned by the scanning system 154. The results may include 3D virtual representations of the dental arch, 2D images or renditions of the dental arch, etc. The dentition display system 156 may further include an input device that allows a dental professional to interact with the 3D or 2D virtual representations of the dental arch. In some examples, the display itself can comprise an input device (e.g., a touch screen display). In other examples, a separate input device such as a controller, keyboard, mouse, joystick, or the like may be used to interact with the contents of the display.

The hook processing system 158 may include a computer system configured to process 3D scans or meshes of a patient's dentition taken by the scanning system 154. The hook processing system 158 may include segmentation engine(s) 160, manufacturing constraints engine(s) 162, clinical constraints engine(s) 164, and treatment modeling engine(s) 166. One or more of the modules of the hook processing system 158 may be coupled to each other or to modules not shown.

As used herein, any "engine" may include one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the figures herein.

The engines described herein, or the engines through which the systems and devices described herein can be implemented, can be cloud-based engines. As used herein, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used herein, "datastores" may include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described herein.

Datastores can include data structures. As used herein, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described herein, can be cloud-based datastores. A cloud-based datastore is a datastore that is compatible with cloud-based computing systems and engines.

The segmentation engine(s) 160 may be configured to implement one or more automated agents configured to process tooth scans from the scanning system 154. The segmentation engine(s) 160 may include graphics engines to process images or scans of a dental arch. In some implementations, the segmentation engine(s) 160 format scan data from a scan of a dental arch into a dental mesh model (e.g., a 3D dental mesh model) of the dental arch. The segmentation engine(s) 160 may also be configured to segment the 3D dental mesh model of the dental arch into individual dental components, including segmenting the 3D dental mesh model into 3D mesh models of individual teeth. The 3D dental mesh models of the dental arch and/or the individual teeth may comprise geometric point clouds or polyhedral objects that depict teeth and/or other elements of the dental arch in a format that can be rendered on the dentition display system 156. The segmentation engine(s) 160 may provide 3D dental mesh models and/or other data to other modules of the hook processing system 158.

The manufacturing constraints engine(s) 162 may implement one or more automated agents configured to determine an area or region on a surface of a target tooth upon which placement of a structure that receive and/or react forces from elastics satisfies manufacturing constraints of the dental appliance. Manufacturing constraints that may limit the placement of hooks or positioning features can include, but not be limited to, distances between multiple hooks or positioning features on the same tooth, proximity of hook or positioning feature to cut line(s) of the dental appliance, angle/orientations of the hook or positioning feature that make it difficult or impossible to remove aligner from mold, etc. The manufacturing constraints engine(s) 162 is configured to automatically determine the area or region on each target tooth for which all manufacturing constraints are met.

The clinical constraints engine(s) 164 may implement one or more automated agents configured to determine an area or region on a surface of a target tooth upon which placement of a structure that receive and/or react forces from elastics satisfies clinical constraints of the dental appliance. Clinical constraints that may limit the placement of hooks or positioning features can include, but not be limited to, hook or positioning feature placements that move inside the gingiva during dental treatment, etc. The clinical constraints engine(s) 164 is configured to automatically determine the area or region on each target tooth for which all manufacturing constraints are met.

The treatment modeling engine(s) 166 may be configured to store and/or provide instructions to implement orthodontic treatment plans and/or the results of orthodontic treatment plans. The treatment modeling engine(s) 168 may provide the results of orthodontic treatment plans on a 3D dental mesh model. The treatment modeling engine(s) 166 may model the results of application of orthodontic aligners to the patient's dental arch over the course of an orthodontic treatment plan. In some implementations, the treatment modeling engine(s) 166 is configured to automatically generate multiple treatment plans with different numbers of treatment stages and different dental arch modifications (hooks, attachments, positioning features, interproximal reductions, etc.). For each treatment plan, the treatment modeling engine(s) 166 can generate a plurality of stages including a final position, staging with tooth movement, and a set of aligner features. In some implementations, the multiple treatment plans can include differing hook or positioning feature placements. The dental professional can manually select a preferred plan or hook/positioning feature placement, or the treatment modeling engine(s) 166 can automatically select the treatment plan.

Figure 1B:
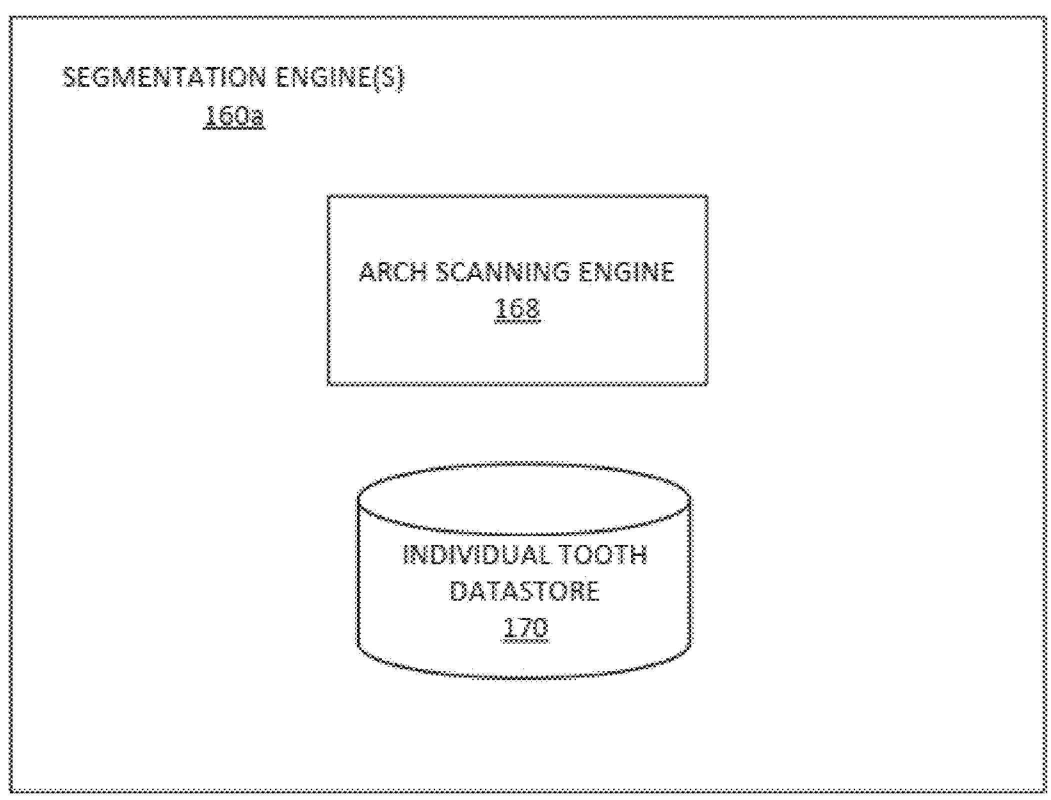
FIG. 1B is a diagram showing an example of segmentation engine(s).

FIG. 1B is a diagram showing an example of the segmentation engine(s) 160*a*. The segmentation engine(s) 160*a* may include an arch scanning engine 168 and an individual tooth segmentation datastore 170. One or more of the modules of the segmentation engine(s) 160*a* may be coupled to each other or to modules not shown.

The arch scanning engine 168 may implement one or more automated agents configured to scan a 3D dental mesh model for individual tooth segmentation data. "Individual tooth segmentation data," as used herein, may include positions, geometrical properties (contours, etc.), and/or other data that can form the basis of segmenting individual teeth from 3D dental mesh models of a patient's dental arch. The arch scanning engine 168 may implement automated agents to separate dental mesh data for individual teeth from a 3D dental mesh model of the dental arch. The arch scanning engine 168 may further implement automated agents to number the individual teeth.

The individual tooth segmentation datastore 170 may be configured to store data related to model dental arches, including model dental arches that have been segmented into individual teeth. The model dental arch data may comprise data related to segmented individual teeth, including tooth identifiers of the individual teeth such as tooth types, tooth numbers, and eruption status(es).

Figure 1C:
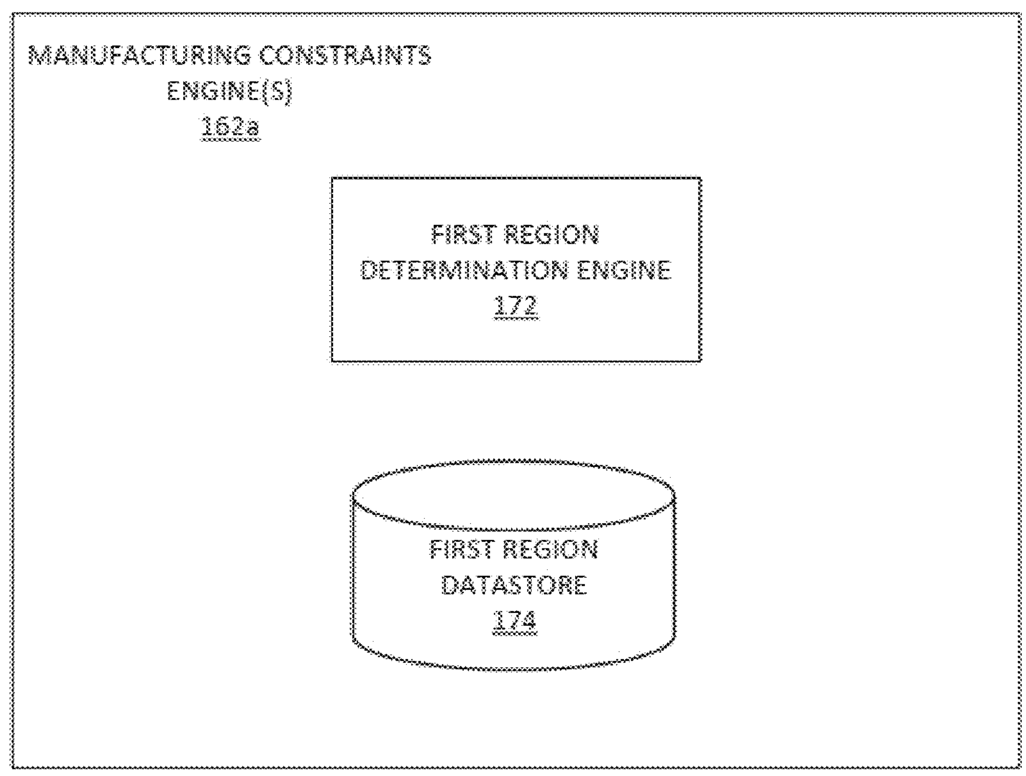
FIG. 1C is a diagram showing an example of a manufacturing constraints engine(s).

FIG. 1C is a diagram showing an example of the manufacturing constraints engine(s) 162*a*. The manufacturing constraints engine(s) 162*a* may include a first region determination engine 172 and a first region datastore 174. One or more of the modules of the manufacturing constraints engine(s) 162*a* may be coupled to each other or to modules not shown.

The first region determination engine 172 may implement one or more automated agents to access the 3D dental mesh model and determine a first region or area on a surface of the target tooth that satisfies a selected group of manufacturing constraints. As described above, these manufacturing constraints can include, but not be limited to, distances between multiple hooks or positioning features on the same tooth, proximity of hook or positioning feature to cut line(s) of the dental appliance, angle/orientations of the hook or positioning feature that make it difficult or impossible to remove aligner from mold, etc. If any of the manufacturing constraints are not satisfied for a specific position on the surface of the tooth, that position will not be included in the first region.

The first region datastore 174 may be configured to store data related the first region, including vectors representing the tooth shape or geometric point clouds or polyhedral objects that depict teeth, tooth surfaces, and/or other elements of the dental arch.

Figure 1D:
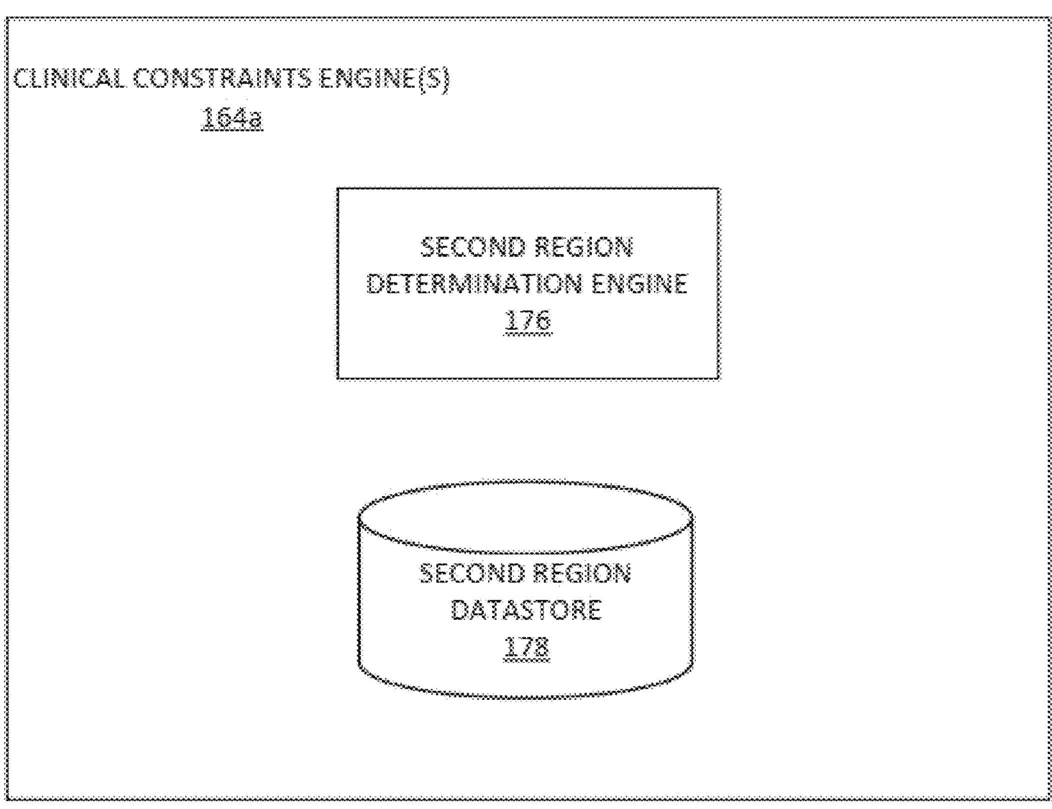
FIG. 1D is a diagram showing an example of a clinical constraints engine(s).

FIG. 1D is a diagram showing an example of the clinical constraints engine(s) 164*a*. The clinical constraints engine(s) 164*a* may include a second region determination engine 176 and a second region datastore 178. One or more of the modules of the clinical constraints engine(s) 164*a* may be coupled to each other or to modules not shown.

The second region determination engine 176 may implement one or more automated agents to access the 3D dental mesh model and determine a second region or area on a surface of the target tooth that satisfies a selected group of clinical constraints. As described above, these clinical constraints can include, but not be limited to, hook or positioning feature placements that move inside the gingiva during dental treatment, etc. If any of the clinical constraints are not satisfied for a specific position on the surface of the tooth, that position will not be included in the second region.

The second region datastore 178 may be configured to store data related the second region, including vectors representing the tooth shape or geometric point clouds or polyhedral objects that depict teeth, tooth surfaces, and/or other elements of the dental arch.

Figure 1E:
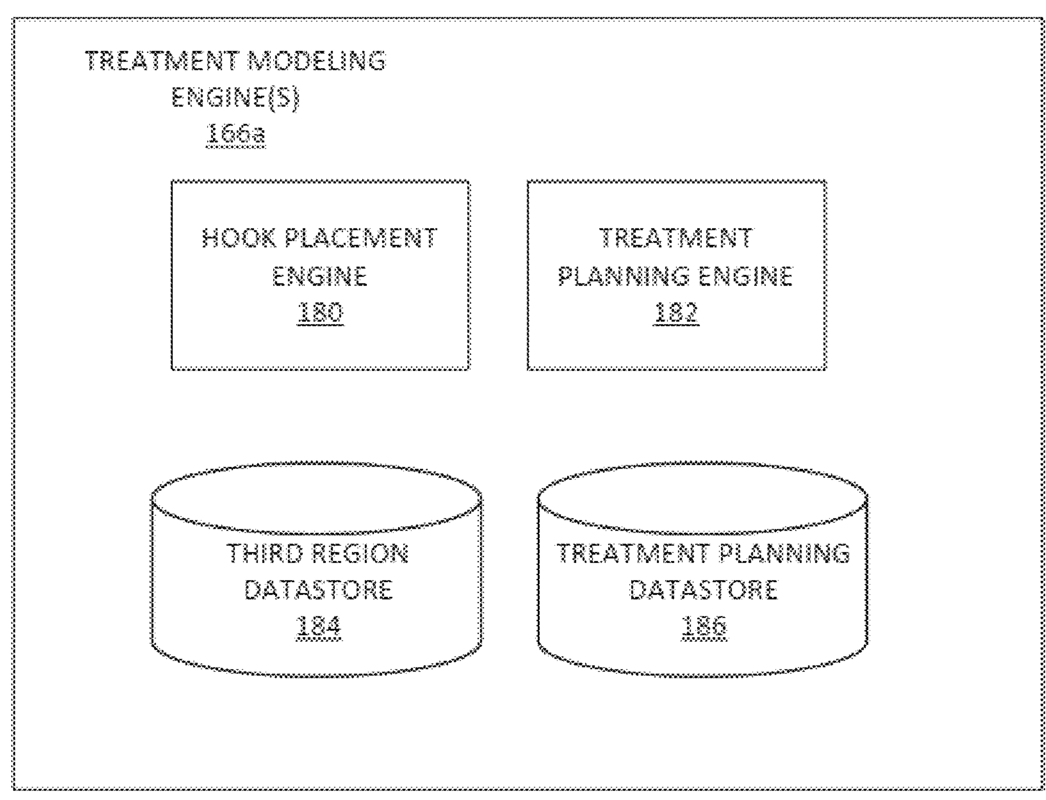
FIG. 1E is a diagram showing an example of a treatment modeling engine(s).

FIG. 1E is a diagram showing an example of the treatment modeling engine(s) 166*a*. The treatment modeling engine(s) 166*a* may include a hook placement engine 180, a treatment planning engine 182, a third region datastore 184, and a treatment planning datastore 186. One or more of the modules of treatment modeling engine(s) 166*a* may be coupled to each other or to modules not shown.

The hook placement engine 176 may implement one or more automated agents to determine the region or area on a surface of the target tooth that satisfies both the manufacturing and clinical constraints. In one implementation, the hook placement engine 176 accesses the first region data for the target tooth from the manufacturing constraints engine(s), and accesses the second region data for the target tooth from the clinical constraints engine(s), and identifies a third region that encompasses the intersection or overlapping portions of the first and second regions.

The third region datastore 178 may be configured to store data related the third region, including vectors representing the tooth shape or geometric point clouds or polyhedral objects that depict teeth, tooth surfaces, and/or other elements of the dental arch.

The treatment planning engine 182 may implement one or more automated agents to create a treatment plan by first building (manually or automatically or a combination of manually and automatically) the comprehensive treatment plan from the 3D dental mesh model, and then segmenting the plan into a series of movement-limited stages. The number of stages depends upon the final positions of the teeth. Stages can be determined by iteratively simplifying the leading tooth movements. The comprehensive treatment plan and the individual stages can be determined by accounting for a number of constraints, including constraints defined by the limits of the aligner system (e.g., the limits on the number of stages, the limits on the amount and rate of movement of each tooth, etc.), limits on where hook and/or positioning features can be placed (e.g., the manufacturing and clinical constraints described above), and the limits required by the dental professional (e.g., restricting movement of some teeth, etc.).

In some situations, it is possible for there to be no hook or positioning feature placements for a target treatment plan stage that satisfy both the manufacturing constraints and the clinical constraints (e.g., there is no overlap or intersection between the first region from the manufacturing constraints engine and the second region from the clinical constraints engine). In this scenario, the treatment planning engine 182 may implement one or more automated agents to divide the target treatment plan stage into two (or more) stages, and re-evaluate the areas or regions on the surface of the target tooth that satisfy both the manufacturing and clinical constraints for the new (shorter in duration) treatment plan stages. The process can repeat, including continuing to divide the target treatment plan stages into smaller stages, until both the manufacturing and clinical constraints are both satisfied. Hook placement can then be chosen by the treatment planning engine 182 for the smaller treatment plan stages that satisfy both the manufacturing and clinical constraints.

The treatment planning datastore 186 may be configured to store the final comprehensive treatment plan(s), including the potential positions and orientations of hooks or positioning features that satisfy the manufacturing and clinical constraints.

Figure 2:
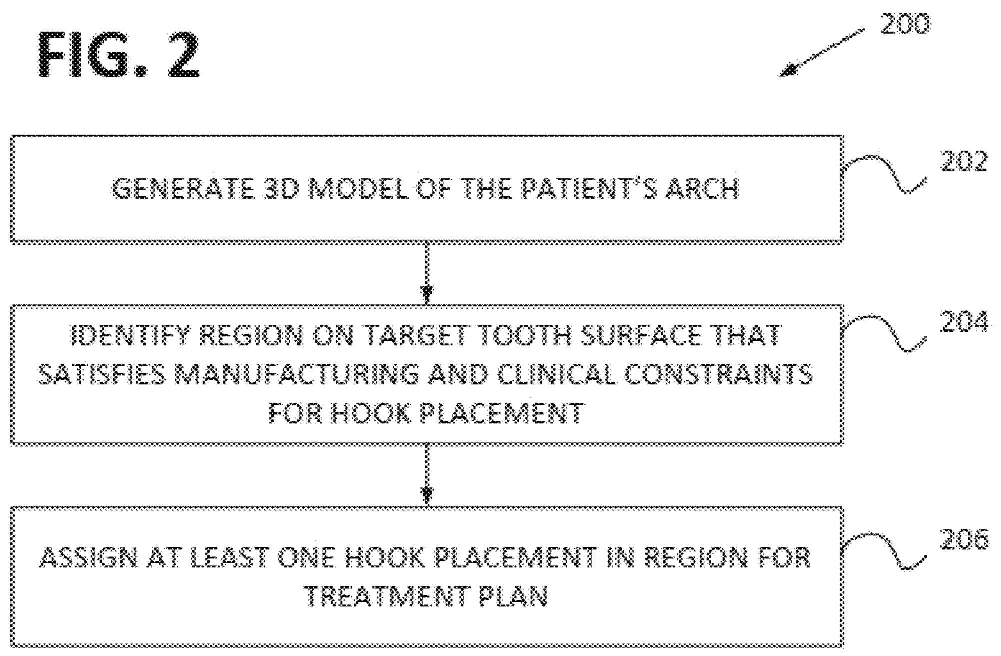
FIG. 2 is an example of a method of determining hook placements during treatment planning.

FIG. 2 illustrates one example of a method 200 for determining hook and or positioning feature placements during dental treatment planning. The method 200 may be implemented by automated agents executed on a system, such as one or more of the systems in the computing environment 100A, shown in FIG. 1A. At an operation 202, a three-dimensional (3D) model of the patient's dental arch may be generated. The model may be generated from a 3D scan that may be collected directly from the patient (e.g., using an intraoral scanner) or indirectly (e.g., by scanning a mold of the patient's dentition and/or be receiving a digital model of the patient taken by another, etc.). In some implementations, the 3D scan may be expressed as a digital mesh and/or segmented into individual teeth (and non-teeth elements, such as gingiva, arch, etc.).

At an operation 204, a region on a target tooth surface that satisfies manufacturing and clinical constraints for hook or positioning feature placement may be identified. The manufacturing constraints, as described above, may ensure that the dental appliance including hooks or positioning features can be manufactured properly. Manufacturing constraints may be limits on placement of features that would otherwise prevent the orthodontic appliance from being manufactured or prevent them from failing after manufacture. For example, manufacturing constraints may include, but are not limited to, constraints on the dimensions (thickness, length, etc.), and/or spacing of the proximity of elements such as hooks, attachments/attachment receiving regions, etc. to prevent them from being too closely spaced, etc. The clinical constraints, as described above, may ensure that the hook or positioning features do not interfere with the treatment itself, such as by moving into or interfering with the gingiva as the patient's teeth move. Clinical constraints include constraints or limits on tooth movement because of dental or anatomic limitations. For example, clinical constraints may include limits preventing movement (e.g., due to hook placement or orientation) beyond more than a threshold distance or rotation during a treatment stage. Other clinical constrains may include limitations preventing hooks from moving into the gingiva, moving too close to the incisal or occlusal surfaces of the tooth, or rotating too much, such that the hooks either cannot grab the elastic bands or cannot apply the appropriate amount of force to the teeth.

The operation 204 can be implemented by identifying a first region on each target tooth surface that satisfies the manufacturing constraints, and then identifying a second region on each target tooth that satisfies the clinical constraints. Next, the operation can identify a third region on each target tooth surface that comprises an overlap or intersection between the first region and the second region. This third region represents the location(s) on each target tooth that satisfy both the manufacturing constraints and the clinical constraints.

The operation 204 can be implemented in a plurality of individual stages that make up a comprehensive treatment plan. Thus, there can be multiple hook or positioning feature placements on the same target tooth depending on the treatment plan stage.

At an operation 206, one or more hooks or positioning features can assigned or placed within the third region for each target tooth in a comprehensive treatment plan. As described above, the treatment plan can be generated from the 3D dental mesh model accounting for a number of constraints, including constraints defined by the limits of the aligner system (e.g., the limits on the number of stages, the limits on the amount and rate of movement of each tooth, etc.), limits on where hook and/or positioning features can be placed (e.g., the manufacturing and clinical constraints described above), and the limits required by the dental professional (e.g., restricting movement of some teeth, etc.). The operation 206 can include hooks or positioning features being placed for one or more individual segments of the overall comprehensive treatment plan.

FIG. 3A illustrates one example of a method 300 for determining hook and or positioning feature placements during dental treatment planning. The method 300 may be implemented by automated agents executed by a system, such as one or more of the systems in the computing environment 100A, shown in FIG. 1A. At an operation 302, a three-dimensional (3D) model of the patient's dental arch may be generated. The model may be generated from a 3D scan that may be collected directly from the patient (e.g., using an intraoral scanner) or indirectly (e.g., by scanning a mold of the patient's dentition and/or be receiving a digital model of the patient taken by another, etc.). In some implementations, the 3D scan may be expressed as a digital mesh and/or segmented into individual teeth (and non-teeth elements, such as gingiva, arch, etc.)

At an operation 304, a first region on a target tooth surface that satisfies manufacturing constraints for hook or positioning feature placement may be identified. The manufacturing constraints, as described above, may ensure that the dental appliance including hooks or positioning features can be manufactured properly. Some examples of manufacturing constraints may include, but not be limited to, distances between multiple hooks or positioning features on the same tooth, proximity of hook or positioning feature to cut line(s)

of the dental appliance, angle/orientations of the hook or positioning feature that make it difficult or impossible to remove aligner from mold, etc. For example, a hook may require a constraint that the hook be of sufficient size and shape so that it can be manufactured as part of the shell aligner.

At an operation 306, a second region on a target tooth surface may be identified that satisfies clinical constraints for hook or positioning feature placement. The clinical constraints, as described above, may ensure that the dental appliance including hooks or positioning features do not interfere with or hinder the treatment plan. Some examples of clinical constraints may include, but not be limited to, hook or positioning feature placements that move inside the gingiva during dental treatment, sufficiently spaced apparat from other teeth, attachments or other structures, maintain an angle relative to another feature of the aligner to prevent loss or dislodging of an elastic material used with the hook, etc.

At an operation 308, a determination whether the first region intersects or overlaps with any portion of the second region may be made. This area of intersection or overlap between the first and second regions indicates an area or region that satisfies both the manufacturing and clinical constraints above.

If there is an intersection between the first and second regions, then at operation 310, the system can identify a third region (e.g., the portion of intersection or overlap between the first and second regions) on the target tooth surface. Finally, at operation 312, the system can assign at least one hook or positioning feature placement in the third region for the target stage of the treatment plan. It should be understood that in some implementations, a target tooth may require more than one hook or positioning feature. In this scenario, the placement of each of the hooks or positioning features must satisfy the manufacturing and clinical constraints above.

If there is no intersection between the first and second regions, then at operation 314, the system can divide the target segment of the treatment plan into two or more (shorter duration) segments (where each segment may span one or more multiple stages of the treatment plan). For example, imagine that the target segment of the treatment plan is the first segment of the treatment plan with a treatment duration of X. In the event that this target segment does not satisfy both the manufacturing and clinical constraints for hook or positioning feature placement, the target segment (i.e., the first segment) can be divided into at least two new segments with the same treatment duration of X. At operation 316, the process can repeat by applying at least operations 302-308 to the newly divided segments comprising stages of the treatment plan; each stage may include a new shell appliance to be worn for some predetermined time period. Thus in this example, the process can repeat for these two new segments to check for manufacturing and clinical constraint compliance. The iterative process of dividing the segments into smaller segments can facilitate finding areas on the target tooth that allow for hook or positioning feature placement while satisfying both the manufacturing and clinical constraints described herein.

FIGS. 3B-C are schematic diagrams illustrating the division of treatment segments in the event that an intersection between manufacturing constraints and clinical constraints cannot be found for a target tooth. FIG. 3B is a chart representing a target tooth that includes a total of 4 segments (each segment may include one or more stages of the treatment plan) over the course of the treatment plan duration. A hook may be included in all of the aligners used as part of each stage. Ideally, the hook may be kept in a constant position relative to the underlying teeth on which it is worn. However, in the event that the manufacturing constrains and clinical constrains do overlap in the same aligner region, the orientation or position of the hook may have to change in some of the treatment stages.

In FIGS. 3B and 3C, it can be seen that the individual segments can have differing time durations (corresponding to different stages) during the course of the treatment. For example, the duration of segment 2 in this example is longer than the durations of stages 1 and 3-4. Referring to FIG. 3B, it can be seen that stage numbers 1, 3, and 4 all satisfy both the manufacturing and clinical constraints (as described above) for the target tooth. For stage 2, however, the target tooth does not have a region that satisfies both constraints. Thus, referring to FIG. 3C, stage number 2 can be divided into two (or more) smaller stages, and the clinical and manufacturing constraints can be evaluated for the target tooth with regard to the new stages. In this example, stage 2 from FIG. 3B has been divided into stages 2-3 in FIG. 3C. As a result, stages 3-4 in FIG. 3B have been renumbered as stages 4-5 in FIG. 3C. Upon evaluating the new stages, it can be determined that new stages 2 and 3 both satisfy the clinical and manufacturing constraints as described above. Thus the treatment plan can be completed with hook and/or positioning feature placement for the target tooth.

Figure 4A:
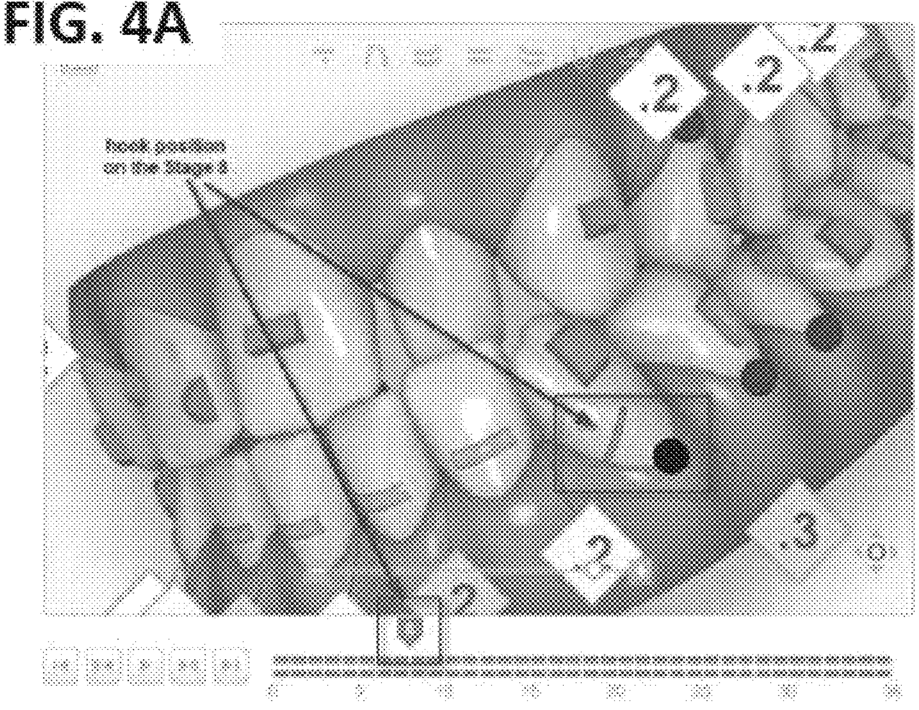
FIGS. 4A and 4B illustrate example screen captures of a displayed virtual representation of a patient's teeth including varying hook positions at different stages of treatment.
Figure 4B:
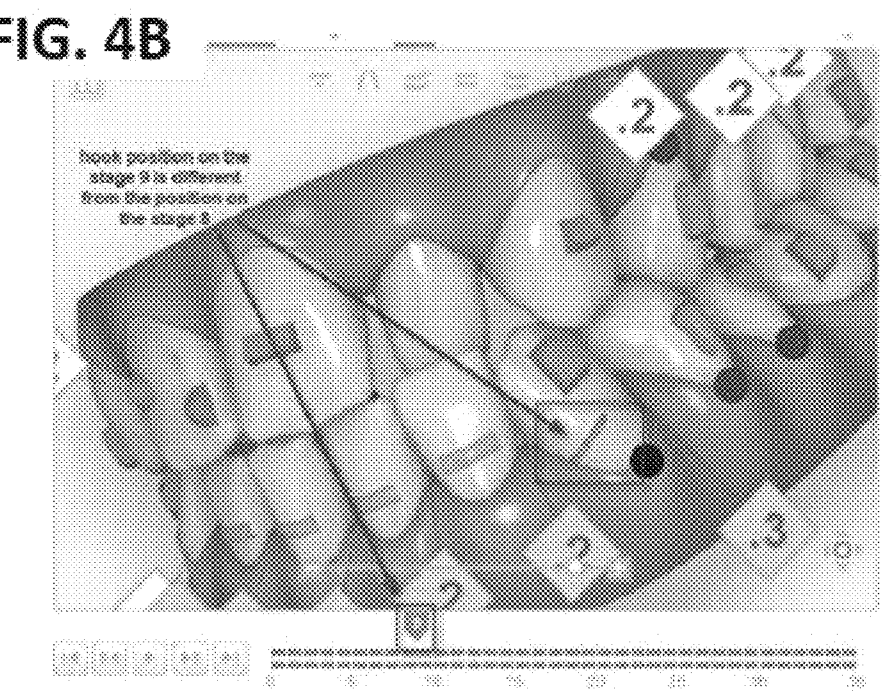

FIGS. 4A-4B illustrate example screen captures of a displayed virtual representation of a patient's teeth including varying hook positions at different stages of treatment. The dental professional can select which stage of the treatment to review, and the hook positions at that stage will be displayed. Additionally, as shown in FIG. 4B, the movement of a hook can be visualized by reviewing later stages (stage 9 is selected in the illustration, compared to stage 8 in FIG. 4A). This gives the dental professional the ability to evaluate how the position of a hook and/or other positioning features change over the course of treatment and to make adjustments to the hook placement if necessary.

Figure 6A:
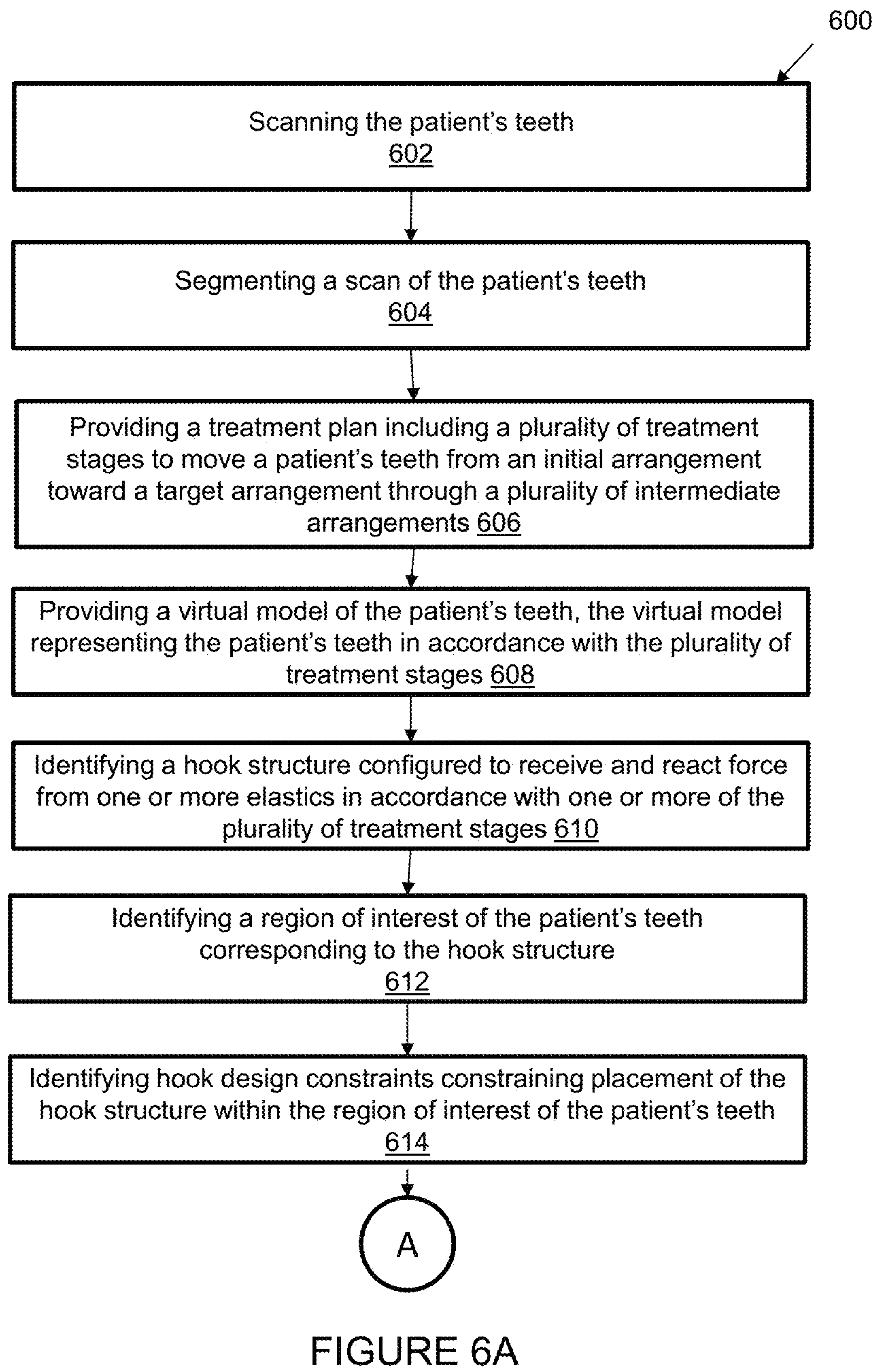
FIGS. 6A and 6B show an example flowchart of a method for making dental appliances with structures that receive and/or react force from elastics.
Figure 6B:
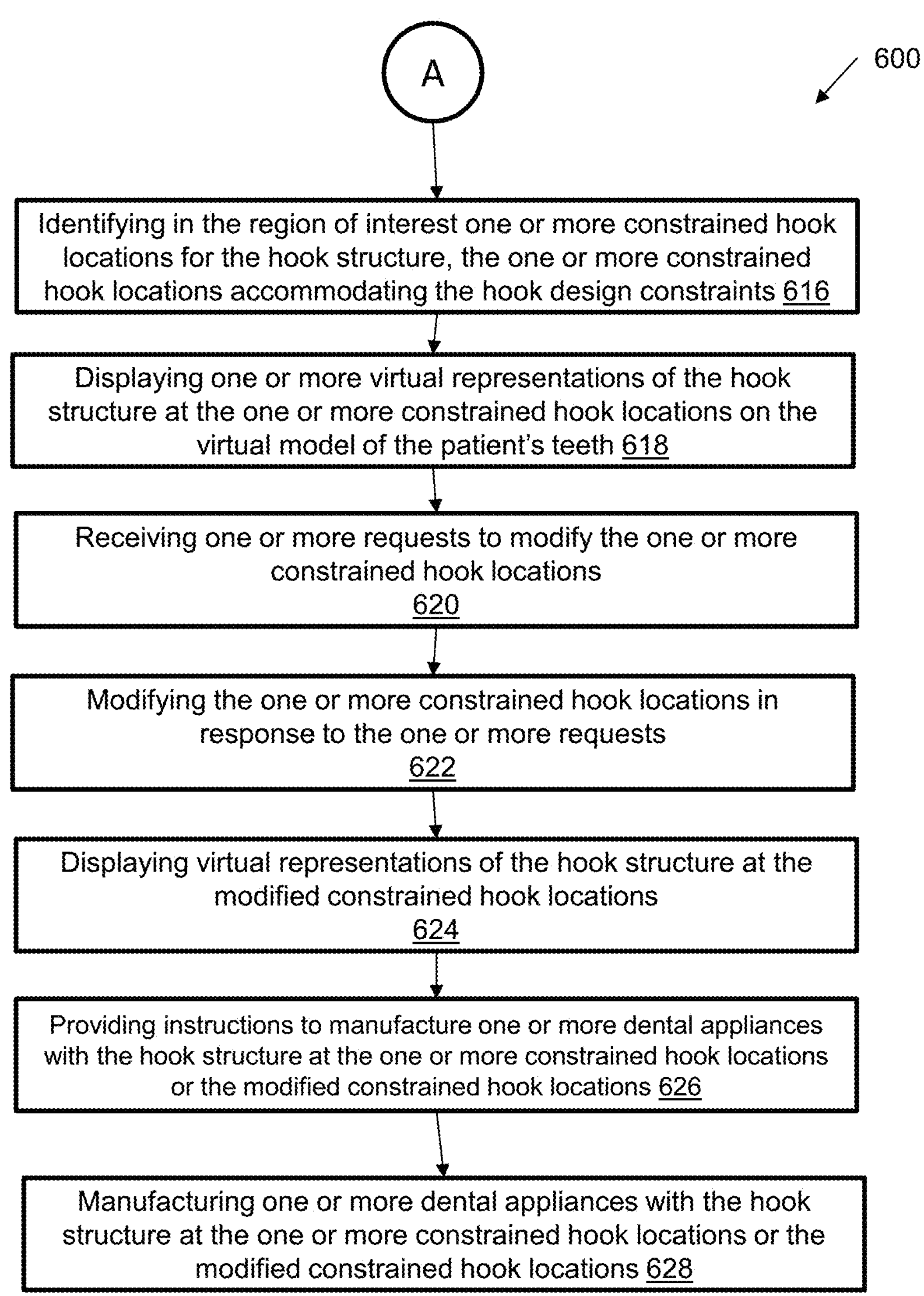

FIGS. 6A and 6B show an example flowchart of a method 600 for making dental appliances with structures that receive and/or react force from elastics. The method 600 may be executed by any structures referenced herein and may involve one or more of the operations of the processes discussed herein. The method 600 may include fewer or a greater number of operations than those depicted in FIGS. 6A and 6B.

At an operation 602, a patient's teeth may be scanned. As noted herein, this operation may be executed by an intraoral scanner, a device to scan physical impressions of the patient's teeth or by some other apparatus. At an operation 604, the scan of the patient's teeth may be segmented to form a segmented tooth model representing the patient's teeth. At an operation 606, a treatment plan may be provided. The treatment plan may include a plurality of treatment stages to move a patient's teeth from an initial arrangement toward a target arrangement through a plurality of intermediate arrangements. The initial arrangement may correspond to the state of the patient's teeth before treatment and the target arrangement may correspond to an intended final position of the patient's teeth after the treatment plan. The intermediate arrangements may incorporate incremental changes in tooth position from the initial position toward the intended final position.

At an operation 608, a virtual model of the patient's teeth may be provided. The virtual model of the teeth may represent the patient's teeth in accordance with the plurality of treatment stages. The virtual model may include a three-dimensional (3D) model of the patient's teeth. The virtual model may depict the initial arrangement, the plurality of intermediate arrangements, and/or the target arrangements as noted herein. Each depiction may correspond to a stage (intended or actual) of the treatment plan.

At an operation 610, hook structure configured to receive and react force from one or more elastics in accordance with one or more of the plurality of treatment stages may be identified. In some implementations, a treatment professional identifies the hook structure based on the requirements of the treatment plan. In various implementations, automated agents identify the hook structure based on the requirements of the treatment plan. The hook structure may have associated with it a data object that represents its properties. In some implementations, the data object has a property (e.g., function, variable, etc.) that associates the hook structure with one or more stages of the treatment plan. The hook structure may comprise a hook, a precision cut, and/or some structure that receives and/or reacts force from an elastic into a dental appliance.

At an operation 612, a region of interest of the patient's teeth corresponding to the hook structure may be identified. The region of interest may correspond to specific regions (e.g., specific cavities, portions of an exterior surface over specific teeth, etc.) on a series of dental appliances configured to implement the treatment plan. Identifying the region of interest may include identifying a tooth of the patient's teeth which is associated with placement of the hook structure during the treatment plan.

At an operation 614, hook design constraints constraining placement of the hook structure within the region of interest of the patient's teeth may be identified. The hook design constraints may comprise manufacturing constraints, clinical constraints, or some combination thereof. The hook design constraints may, e.g., constrain placement of the hook structure in the region of interest due to an interference with a gingival region of the patient's teeth. The hook design constraints may, e.g., the hook design constraints constrain placement of the hook structure in the region of interest due to an interference with virtual fillers used to model a dental appliance for the patient's teeth. The flowchart 600 may move to block A and then to operation 616.

At an operation 616, one or more constrained hook locations for the hook structure may be identified in the region of interest. The one or more constrained hook locations may accommodate the hook design constraints. For instance, the one or more constrained hook locations may be moved away from their initial locations in order to get away from attachments, gingival lines, and/or other areas that form the basis of hook design constraints. As noted herein, the constrained hook locations may be iteratively determined by placing the hook structure at various locations and then evaluating the hook structure for compliance with hook design constraints.

At an operation 618, one or more virtual representations of the hook structure may be displayed at the one or more constrained hook locations on the virtual model of the patient's teeth. The virtual representations may comprise animations, graphical depictions, etc. of the hook structures at the one or more constrained hook locations. In some implementations, displaying the one or more virtual representations of the hook structure may include doing so on two or more treatment stages of the plurality of treatment stages represented by the virtual model. For instance, it may include displaying the one or more virtual representations of the hook structure on representations of intermediate and/or final stages of the treatment plan.

At an operation 620, one or more requests to modify the one or more constrained hook locations may be received from a treatment professional and/or an automated agent. In some implementations, an automated agent iteratively provides requests to modify the one or more constrained hook locations and evaluates those locations for compliance with the hook design constraints. The requests to modify the one or more constrained hook locations may include deleting the one or more virtual representations of the hook structure, moving the one or more constrained hook locations, etc. At an operation 622, the one or more constrained hook locations may be modified in response to the one or more requests, e.g., they may be deleted, moved, etc. In various implementations, the request to modify is performed at a first stage (e.g., a final or a specific intermediate stage), and the modification occurs at the first stage and/or second stage(s) (e.g., other specific intermediate stages).

At an operation 624, the virtual representations of the hook structure at the modified constrained hook locations may be displayed. At an operation 626, instructions to manufacture one or more dental appliances with the hook structure at the one or more constrained hook locations or the modified constrained hook locations may be provided. At an operation 628, the dental appliances so configured may be manufactured through indirect and/or direct fabrication techniques.

Figure 5:
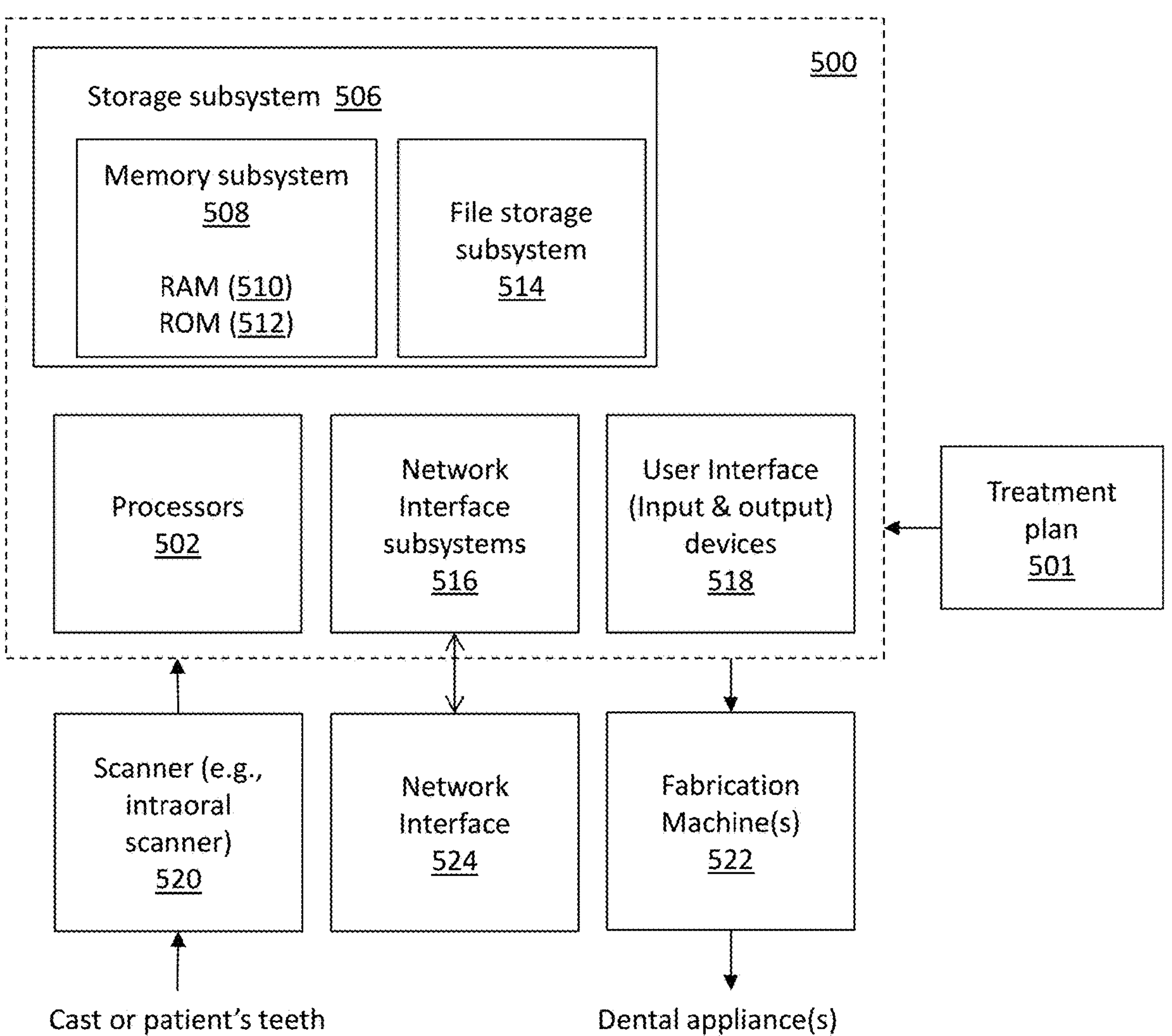
FIG. 5 is a simplified block diagram of a data processing system that may perform the methods described herein.

The methods described herein may be performed by an apparatus, such as a data processing system, which may include hardware, software, and/or firmware for performing many of these steps described above. For example, FIG. 5 is a simplified block diagram of a data processing system 500. Data processing system 500 typically includes at least one processor 502 which communicates with a number of peripheral devices over bus subsystem 504. These peripheral devices typically include a storage subsystem 506 (memory subsystem 508 and file storage subsystem 514), a set of user interface input and output devices 518, and an interface to outside networks 516, including the public switched telephone network. This interface is shown schematically as "Modems and Network Interface" block 516, and is coupled to corresponding interface devices in other data processing systems over communication network interface 524. Data processing system 500 may include a terminal or a low-end personal computer or a high-end personal computer, workstation or mainframe.

The user interface input devices typically include a keyboard and may further include a pointing device and a scanner. The pointing device may be an indirect pointing device such as a mouse, trackball, touchpad, or graphics tablet, or a direct pointing device such as a touchscreen incorporated into the display. Other types of user interface input devices, such as voice recognition systems, may be used.

User interface output devices may include a printer and a display subsystem, which includes a display controller and a display device coupled to the controller. The display device may be a cathode ray tube (CRT), a flat-panel device such as a liquid crystal display (LCD), or a projection device. The display subsystem may also provide nonvisual display such as audio output.

Storage subsystem 506 maintains the basic programming and data constructs that provide the functionality of the present invention. The software modules discussed above are typically stored in storage subsystem 506. Storage subsystem 506 typically comprises memory subsystem 508 and file storage subsystem 514.

Memory subsystem 508 typically includes a number of memories including a main random access memory (RAM) 510 for storage of instructions and data during program execution and a read only memory (ROM) 512 in which fixed instructions are stored. In the case of Macintosh-compatible personal computers the ROM would include portions of the operating system; in the case of IBM-compatible personal computers, this would include the BIOS (basic input/output system).

File storage subsystem 514 provides persistent (nonvolatile) storage for program and data files, and typically includes at least one hard disk drive and at least one floppy disk drive (with associated removable media). There may also be other devices such as a CD-ROM drive and optical drives (all with their associated removable media). Additionally, the system may include drives of the type with removable media cartridges. The removable media cartridges may, for example be hard disk cartridges, such as those marketed by Syquest and others, and flexible disk cartridges, such as those marketed by Iomega. One or more of the drives may be located at a remote location, such as in a server on a local area network or at a site on the Internet's World Wide Web.

In this context, the term "bus subsystem" is used generically so as to include any mechanism for letting the various components and subsystems communicate with each other as intended. With the exception of the input devices and the display, the other components need not be at the same physical location. Thus, for example, portions of the file storage system could be connected over various local-area or wide-area network media, including telephone lines. Similarly, the input devices and display need not be at the same location as the processor, although it is anticipated that the present invention will most often be implemented in the context of PCS and workstations.

Bus subsystem 504 is shown schematically as a single bus, but a typical system has a number of buses such as a local bus and one or more expansion buses (e.g., ADB, SCSI, ISA, EISA, MCA, NuBus, or PCI), as well as serial and parallel ports. Network connections are usually established through a device such as a network adapter on one of these expansion buses or a modem on a serial port. The client computer may be a desktop system or a portable system.

Scanner 520 is responsible for scanning casts of the patient's teeth obtained either from the patient or from an orthodontist and providing the scanned digital data set information to data processing system 500 for further processing. In a distributed environment, scanner 520 may be located at a remote location and communicate scanned digital data set information to data processing system 500 over network interface 524.

Fabrication machine 522 fabricates dental appliances based on intermediate and final data set information received from data processing system 500. In a distributed environment, fabrication machine 522 may be located at a remote location and receive data set information from data processing system 500 over network interface 524.

Various alternatives, modifications, and equivalents may be used in lieu of the above components. Although the final position of the teeth may be determined using computer-aided techniques, a user may move the teeth into their final positions by independently manipulating one or more teeth while satisfying the constraints of the prescription.

Additionally, the techniques described here may be implemented in hardware or software, or a combination of the two. The techniques may be implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices.

Each program can be implemented in a high level procedural or object-oriented programming language to operate in conjunction with a computer system. However, the programs can be implemented in assembly or machine language, if desired. In any case, the language may be a compiled or interpreted language.

Each such computer program can be stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Thus, any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like.

While preferred embodiments of the present disclosure have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and/or methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the patient matter may be practiced. As mentioned, other embodiments may be utilized and derived there from, such that structural and logical substitutions and changes may be made without departing from the scope of this disclosure. Such embodiments of the inventive patient matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
one or more processors;
a fabrication machine; and
memory coupled to the one or more processors, the memory configured to store computer-program instructions, that, when executed by the one or more processors, implement a computer-implemented method, the computer-implemented method comprising:
identifying a portion of a 3D model of a patient's dentition corresponding to a target tooth surface, the identifying:
identifying a first region of the target tooth surface upon which placement of at least one dental appliance having at least one positioning feature that satisfies a predetermined manufacturing constraints for the at least one dental appliance;
identifying a second region of the target tooth surface, different from the first region of the target tooth surface, upon which placement of the at least one dental appliance having the at least one positioning feature that satisfies a predetermined clinical constraints for the at least one dental appliance;
identifying a third region of the target tooth surface comprising an intersection of the first region and the second region, wherein the third region satisfies the predetermined manufacturing constraint and the predetermined clinical constraint;
developing a dental treatment plan with at the least one positioning feature as part of the at least one dental appliance in a position that satisfies the predetermined manufacturing and clinical constraints for the dental appliance associated with the third region of the target tooth surface;
outputting the dental treatment plan; and
manufacturing, with the fabrication machine, the at least one dental appliance based on the dental treatment plan.

2. The system of claim 1, wherein developing the dental treatment plan further comprises including the at least one positioning feature on each of a series of dental appliances that include the at least one dental appliance at the position that corresponds to a region of the target tooth in a same orientation relative to the target tooth for each of a plurality of sequential stages of the dental treatment plan in which the at least one positioning feature satisfies the predetermined manufacturing and clinical constraints for the series of dental appliances.

3. The system of claim 1, further comprising gathering the 3D model by one or more of: taking the 3D model of the patient's teeth, receiving the 3D model of the patient's teeth from an intraoral scanner and receiving the 3D model from a scan of a mold of the patient's teeth.

4. The system of claim 1, wherein the dental plan comprises a plurality of incremental stages.

5. The system of claim 4, wherein the identifying and developing steps are performed for each of the plurality of incremental stages.

6. The system of claim 1, wherein the at least one positioning feature includes a hook feature placement.

7. The system of claim 1, wherein identifying the portion of the 3D model is part of an operation of segmenting the 3D model of the patient's dentition.

8. The system of claim 1, wherein the at least one positioning feature is configured to serve as an anchor point for elastic bands to assist in movement of the target tooth.

9. A method of determining positioning feature placements during dental treatment planning, the method comprising:
identifying a portion of a 3D model of a patient's dentition corresponding to a target tooth surface, the identifying comprising:
identifying a first region of the target tooth surface upon which placement of a dental appliance having at least one positioning feature satisfies a predetermined manufacturing constraint for the dental appliance; and
identifying a second region of the target tooth surface, different than the first region of the target tooth surface, upon which placement of the dental appliance having the at least one positioning feature will satisfy a predetermined clinical constraint for the dental appliance;
identifying a third region of the target tooth surface comprising an intersection of the first region and the second region, wherein the third region satisfies the predetermined manufacturing constraint and the predetermined clinical constraint;
developing a first stage of a dental treatment plan with at least one positioning feature placed on the dental appliance in a position that corresponds with the third region of the target tooth;
outputting the dental treatment plan; and
manufacturing the dental appliance based on the dental treatment plan.

10. The method of claim 9, wherein developing the dental treatment plan comprises overlaying a graphic with the at least one positioning feature on the 3D model of the patient's dentition.

11. The method of claim 9, further comprising gathering the 3D model by one or more of: taking the 3D model of the patient's teeth, receiving the 3D model of the patient's teeth from an intraoral scanner and receiving the 3D model from a scan of a mold of the patient's teeth.

12. The method of claim 9, wherein the dental plan comprises a plurality of incremental stages.

13. The method of claim 12, wherein the identifying and developing steps are performed for each of the plurality of incremental stages.

14. The method of claim 9, further comprising outputting a modified version of the 3D model of the patient's teeth to include the at least one positioning feature placement.

15. The method of claim 9, wherein identifying the portion of the 3D model is part of an operation of segmenting the 3D model of the patient's dentition.

16. The method of claim 9, further comprising identifying a fourth region of the target tooth surface, different from the third region, comprising the intersection between the first region and the second region, wherein developing the dental treatment plan further comprises determining a second positioning feature that corresponds with the fourth region of the target tooth surface.

17. The method of claim 9, further comprising:
developing a second stage of the dental treatment plan, the developing comprising:
identifying that the first region does not intersect with the second region for the second stage of the dental treatment plan over a duration of the second stage;

dividing the second stage of the dental treatment plan into at least two new stages over the target stage duration; and repeating the identifying steps for the first, second, and third regions for the at least two new stages.

18. The method of claim 9, wherein the at least one positioning feature comprises a hook feature.

19. The method of claim 9, wherein the at least one positioning feature is configured to serve as an anchor point for elastic bands to assist in movement of the target tooth.

* * * * *